Jan. 2, 1923. 1,440,422
T. H. THOMAS.
FLUID PRESSURE BRAKE DEVICE.
FILED APR. 3, 1920.
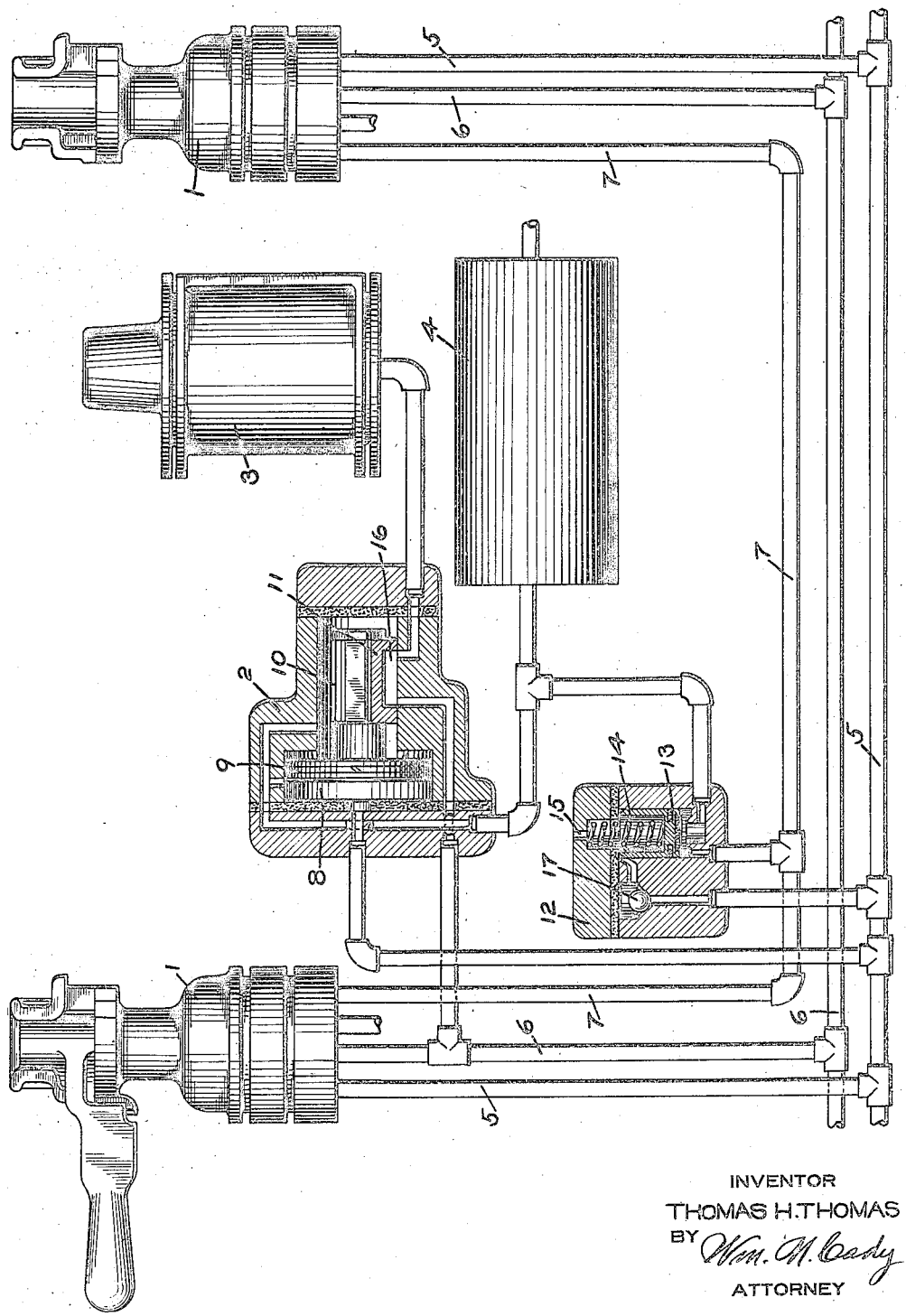
INVENTOR
THOMAS H. THOMAS
BY Wm. N. Cady
ATTORNEY Patented Jan. 2, 1923.

1,440,422

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-BRAKE DEVICE.

Application filed April 3, 1920. Serial No. 370,964.

*To all whom it may concern:*

Be it known that I, THOMAS H. THOMAS, a citizen of the United States, residing at Edgewood, in the county of Allegheny and State of Pennsylvania, have invented new and useful Improvements in Fluid-Pressure-Brake Devices, of which the following is a specification.

This invention relates to fluid pressure brakes, and more particularly to a brake equipment in which fluid under pressure for controlling the brakes is supplied from a main reservoir or other source of pressure.

If the supply pipe from the main reservoir to the brake valve should break or leak, the pressure in the main reservoir may be reduced to such an extent that the brakes could not be applied and this may happen without the operator becoming aware of the fact until he attempts to apply the brakes.

The principal object of my invention is to provide means operated upon a predetermined reduction in pressure in the main reservoir for cutting off communication from the main reservoir to the supply pipe and for effecting an application of the brakes.

In the accompanying drawing, the single figure is a diagrammatic view, partly in section, of a fluid pressure brake equipment, embodying my invention.

As shown in the drawing, the equipment may comprise a brake valve device 1 at each end of the car, an emergency valve device 2, a brake cylinder 3, a main reservoir 4 adapted to be charged with fluid under pressure, a brake pipe 5, a straight air pipe 6, and a main reservoir supply pipe 7.

The emergency valve device 2 may comprise a casing, having a piston chamber 8, connected to brake pipe 5 and containing a piston 9, and a valve chamber 10, connected to the main reservoir 4 and containing a slide valve 11, adapted to be operated by piston 9.

Interposed in the connection from the main reservoir 4 to the supply pipe 7 is a valve device comprising a casing 12 containing a valve piston 13, subject on one side to the pressure of a coil spring 14 and having the spring side of the valve open to an atmospheric exhaust port 15 and adapted in one seated position to close communication from the brake pipe 5 to the exhaust port 15 and establish communication from the main reservoir 4 to the supply pipe 7 and in its opposite position to close communication from the main reservoir to the supply pipe, and open communication from the brake pipe to the exhaust port 15.

In operation, with the main reservoir 4 charged with fluid under pressure, either brake valve 1 may be operated in the usual manner for controlling the brakes.

If it is desired to effect a straight air application of the brakes, the brake valve is turned to straight air application position, in which fluid under pressure is supplied from the main reservoir supply pipe 7 through the brake valve 1 to the straight air pipe 6 and thence through cavity 16 in slide valve 11 to the brake cylinder 3.

Upon a reduction in pressure in the brake pipe 5, the piston 9 of the emergency valve device operates the slide valve 11 so that fluid is supplied from the valve chamber 10 and the main reservoir 4 directly to the brake cylinder 3 to effect an emergency application of the brakes.

When the main reservoir 4 is being charged with fluid under pressure, the valve piston 13 is held to its lower seat by the spring 14, cutting off communication from the main reservoir 4 to the supply pipe 7, until the pressure in the main reservoir has been increased to a predetermined degree, corresponding with the pressure of the spring 14.

As soon as the main reservoir pressure exceeds a predetermined degree, the valve piston 13 will be shifted to its upper position, permitting the supply of fluid under pressure from the main reservoir 4 to the supply pipe 7.

If the pressure in the main reservoir 4 should become reduced below a predetermined degree by the breakage of the supply pipe 7 or leakage, the valve piston 13 will be shifted to its lower seat, cutting off communication from the main reservoir to the supply pipe 7 and opening communication from the brake pipe 5 past check valve 17 to exhaust port 15.

The pressure in the brake pipe 5 is thus reduced, causing the piston 9 of the emergency valve device to shift to emergency position, in which fluid under pressure is supplied from the main reservoir 4 to the brake cylinder 3 to effect an emergency application of the brakes.

Having now described my invention, what I claim as new and desire to secure by Letters Patent, is:—

1. In a fluid pressure brake, the combination with a source of fluid pressure and a fluid pressure supply pipe connected to said source, of a brake pipe and means operated upon a predetermined reduction in pressure of said source of supply for cutting off communication from the source of supply to the supply pipe and for venting fluid from the brake pipe to effect an application of the brakes.

2. In a fluid pressure brake, the combination with a main reservoir and a main reservoir supply pipe, of a brake pipe and means normally establishing communication from the main reservoir to the main reservoir supply pipe and operating upon a predetermined reduction in main reservoir pressure for cutting off said communication and for venting fluid from the brake pipe to effect an application of the brakes.

3. In a fluid pressure brake, the combination with a brake valve for controlling the application and release of the brakes, a main reservoir, a main reservoir supply pipe, through which fluid under pressure is supplied from the main reservoir to the brake valve device, a brake pipe, a valve device operated upon a reduction in brake pipe pressure for effecting an application of the brakes, and valve means operated upon a predetermined reduction in main reservoir pressure for cutting off communication from the main reservoir to the main reservoir supply pipe and for venting fluid from the brake pipe to effect an application of the brakes.

4. In a fluid pressure brake, the combination with a brake valve for controlling the application and release of the brakes, a main reservoir, a main reservoir supply pipe, through which fluid under pressure is supplied from the main reservoir to the brake valve device, a brake pipe, a valve device operated upon a reduction in brake pipe pressure for effecting an application of the brakes, and a valve piston normally establishing communication from the main reservoir to the main reservoir supply pipe and operated upon a predetermined reduction in main reservoir pressure for cutting off said communication and for venting fluid from the brake pipe to effect an application of the brakes.

In testimony whereof I have hereunto set my hand.

THOMAS H. THOMAS.